(12) United States Patent
Xia et al.

(10) Patent No.: US 7,662,461 B2
(45) Date of Patent: Feb. 16, 2010

(54) SYNTHETIC LEATHER ARTICLES AND METHODS FOR PRODUCING THE SAME

(75) Inventors: Jusong Xia, Gastonia, NC (US); Zhaolin Zhou, Singapore (SG); Chenghua Chen, Rd Gongping (CN)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 11/395,665

(22) Filed: Mar. 31, 2006

(65) Prior Publication Data

US 2007/0231546 A1    Oct. 4, 2007

(51) Int. Cl.
*B32B 3/12* (2006.01)
*A61F 13/15* (2006.01)
*B32B 27/40* (2006.01)

(52) U.S. Cl. .................... 428/160; 428/904; 428/423.1; 442/152

(58) Field of Classification Search ................. 442/152; 428/423.1, 160
See application file for complete search history.

(56) References Cited

U.S. PATENT DOCUMENTS

| | | | |
|---|---|---|---|
| 3,157,663 A | 11/1964 | Bencze |
| 3,496,001 A | 2/1970 | Minobe et al. |
| 3,841,897 A | 10/1974 | Okazaki et al. |
| 3,879,336 A | 4/1975 | Maeda et al. |
| 3,880,797 A | 4/1975 | Maeda et al. |
| 3,959,049 A | 5/1976 | Tanaka et al. |
| 3,970,601 A | 7/1976 | Weber et al. |
| 4,026,931 A | 5/1977 | Wiesel et al. |
| RE29,711 E | 7/1978 | Wood |
| 4,190,572 A | 2/1980 | Nishimura et al. |
| 4,284,729 A | 8/1981 | Cross et al. |
| 4,349,597 A | 9/1982 | Fine et al. |
| 4,412,022 A | 10/1983 | Hirai et al. |
| 4,620,852 A | 11/1986 | Nishikawa et al. |
| 4,640,690 A | 2/1987 | Baumgartner et al. |
| 4,812,141 A | 3/1989 | Baumgartner et al. |
| 5,125,930 A | 6/1992 | Taniguchi |
| 5,731,398 A | 3/1998 | Ragsdale et al. |
| 6,274,203 B1 | 8/2001 | Kawaguchi et al. |
| 2003/0211334 A1 | 11/2003 | Jones |
| 2004/0063889 A1 | 4/2004 | Kaul et al. |
| 2006/0141228 A1* | 6/2006 | Rearick et al. ............... 428/212 |

FOREIGN PATENT DOCUMENTS

| | | | |
|---|---|---|---|
| EP | 0 318 294 B1 | | 12/1994 |
| EP | 0 690 084 A1 | | 1/1996 |
| EP | 0 837 082 | * | 4/1998 |
| WO | WO 02/066483 A1 | | 8/2002 |
| WO | WO 02/066563 A1 | | 8/2002 |

OTHER PUBLICATIONS

Miley, J., *Pure & Appl. Chem.*, vol. 68(7), pp. 1423-1428 (1996).
Oertel, G., *Polyurethane Handbook*, (2$^{nd}$ Ed.), Hansen Publishers, pp. 575-594 (1994).
Randall, D. and Steve Lee, *The Polyurethanes Book*, John Wiley & Sons Ltd., pp. 336-337 (2002).

* cited by examiner

*Primary Examiner*—Lynda Salvatore
(74) *Attorney, Agent, or Firm*—Robert M. Lanning

(57) ABSTRACT

Novel synthetic leather articles comprise a substrate and a coating applied to a surface of the substrate. The coating comprises a resin and a polymeric colorant. The polymeric colorant comprises a chromophore and an oligomeric constituent bound to the chromophore. Novel methods for producing synthetic leather articles using polymeric colorants are also provided.

8 Claims, No Drawings

SYNTHETIC LEATHER ARTICLES AND METHODS FOR PRODUCING THE SAME

FIELD OF THE INVENTION

The present invention is directed to substrates comprising a coating on the surface thereof, such as substrates having a coating thereon intended to mimic the look and feel of leather.

BACKGROUND OF THE INVENTION

Synthetic leather typically is produced by coating or laminating an elastic polymer resin, such as a polyurethane resin, a polyvinyl chloride resin, or a blend of such resins, onto the surface of a fibrous base material. In order to produce a synthetic leather in a variety of colors and/or shades, various pigments or dyes have been used to color the resin applied to the surface of the base material. However, the use of such pigments and dyes has not been without its disadvantages and drawbacks.

For example, pigments usually have low tinting strength and a dull shade, which can limit the aesthetic qualities of synthetic leather produced using them. Pigments typically lack solubilizing groups, which frequently allows the pigment particles to aggregate and form larger secondary and tertiary aggregate particles during production processes. Owing to these difficulties, synthetic leathers colored with conventional pigments often exhibit poor color retention, have a dark or dull shade, or contain unsuitable variations in color depth. While these problems can be partially addressed through the addition of dispersing agents or by utilizing pigment dispersions, these measures often result in increased production costs and still require great care to minimize color variations produced by settling of the pigment(s) and/or incompatibility of these components with the resin.

Dyes, on the other hand, typically contain solubilizing groups that can facilitate dispersion of the dye in a suitable medium. Dyes also typically exhibit relatively high tinting strength, good transparency, good thermal stability, and acceptable resin compatibility. Nevertheless, dyes typically exhibit poor weather durability, poor water resistance, poor oil resistance, and often migrate or bleed through to the transfer substrates, such as a release paper, used to produce the synthetic leather. In order to address the migration of dyes to the transfer substrate, attempts have been made to utilize nylon or polyurethane overcoats applied to the transfer substrate. However, satisfactory topcoats have not been developed without incurring significantly higher cost.

A need therefore remains for novel colored synthetic leather articles that address the deficiencies of articles produced with conventional pigments and dyes, while still exhibiting the desired aesthetic qualities. The present invention provides such articles and methods for producing the same.

BRIEF SUMMARY OF THE INVENTION

A synthetic leather article comprises a substrate and a coating on at least one surface of the substrate. The coating comprises a resin and a polymeric colorant. The polymeric colorant comprises a chromophore and an oligomeric constituent bound to the chromophore.

A method for producing a synthetic leather articles comprises the steps of (a) providing a resin or prepolymer, (b) providing a polymeric colorant, (c) mixing the polymer colorant and the resin or prepolymer to form a mixture, (d) applying the mixture obtained in step (c) onto a transfer substrate and heating the substrate to dry the substrate and form a resin coating thereon, (e) applying an adhesive onto the resin coating produced in step (d), (f) applying a backing substrate to the adhesive layer produced in step (e), (g) heating the assembly produced in step (f) to dry the assembly and bond the fibrous backing substrate to the adhesive layer, and (h) removing the transfer substrate from the assembly produced in (g) to produce a synthetic leather article.

A method for producing a synthetic leather articles comprises the steps of (a) providing a resin or prepolymer, (b) providing a polymeric colorant, (c) mixing the polymer colorant and the resin or prepolymer to form a mixture, (d) applying the mixture obtained in step (c) onto a backing substrate, (e) immersing the coated substrate obtained in step (d) in an aqueous solution to cure the resin or prepolymer and form a coating on the surface thereof, (f) removing the substrate from the aqueous solution, and (g) heating the substrate to dry the substrate and produce a synthetic leather article.

DETAILED DESCRIPTION OF THE INVENTION

A synthetic leather article comprises a substrate and a coating on at least one surface of the substrate. The coating comprises a resin and a polymeric colorant. The polymeric colorant can be dispersed within the resin or the polymeric colorant and the resin can be copolymerized to produce a colored resin.

The substrate can be any suitable substrate, such as a fibrous substrate. In certain possibly preferred embodiments, the substrate is a textile material. Suitable textiles include, but are not limited to, woven textiles, knit textiles, and nonwovens. The textiles can be made from any suitable natural fibers, synthetic fibers, or combinations thereof.

In order to promote adhesion between the substrate and the coating, the substrate can comprise a precoat layer on the surface to which the coating is applied. The precoat layer can comprise any suitable material, such as a material that promotes adhesion between the substrate and the coating. For example, the precoat layer can comprise elastomeric polymers.

The resin in the coating can be any suitable resin. The resin typically will be selected to provide an article that is flexible and durable, while providing the properties necessary or desirable for mimicking real leather. In certain possibly preferred embodiments, the resin is selected from the group consisting of polyurethane resins, polyurea resins, and combinations thereof. Suitable polyurethanes include linear polyurethanes as well as cross-linked polyurethanes, such as a polyurethane cross-linked with hexamethylene diisocyanate trimer.

The resins suitable for use in the coating can be produced using any suitable polyol. Suitable polyols include, but are not limited to, glycols of low molecular weight, such as ethylene glycol, 1,2-propylene glycol, 1,3-propylene glycol, 1,4-butylene glycol, and 1,6-hexamethylene glycol; polyester diols obtained from dibasic acids, such as adipic acid, maleic acid, and terephthalic acid; polyester diols, such as polylactones obtained by subjecting lactones to ring-opening polymerization with glycols; polycarbonate diols; and polyether diols, such as polytetramethylene glycol, polyethylene glycol, and polypropylene glycol.

The resins suitable for use in the coating can be produced using any suitable isocyanate. Suitable isocyanates include, but are not limited to, aromatic diisocyanates, such as toluene-2,4-diisocyanate (TDI), 4-methoxy-1,3-phenylene diisocyanate, 4-isopropyl-1,3-phenylene diisocyanate, 4-chloro-1,3-phenylene diisocyanate, 4-butoxy-1,3-phenylene diisocyanate, 2,4-diisocyanatodiphenyl ether, 4,4'-methylenebis(phenyl-isocyanate) (MDI), polymeric MDI, durylene diisocyanate, tolidine diisocyanate, xylylene diisocyanate (XDI), 1,5-naphthalene diisocyanate, benzidine diisocyanate, o-nitrobenzidine diisocyanate, and 4,4-diisocyanatodibenzyl; aliphatic diisocyanates, such as methylene diisocyanate, 1,4-tetramethylene diisocyanate, 1,6-hexamethylene diisocyanate, and 1,10-decamethylene diisocyanate; alicyclic diisocyanates, such as 1,4-cyclohexylene diisocyanate, 4,4-methylene-bis(cyclohexylisocyanate), 1,5-tetrahydronaphthalene diisocyanate, isophorone diisocyanate, hydrogenated MDI, and hydrogenated XDI; and polyurethane prepolymers obtained by reacting any of the aforementioned diisocyanates with polyols or polyamines of low molecular weights such that the resulting prepolymers have isocyanate groups at ends thereof. Among the aforementioned, aromatic diisocyanates, particularly diphenylmethane-4,4'-diisocyante (4,4'-MDI) or polymeric MDI, are preferred for obtaining articles exhibiting good physical characteristics such as thermal stability, solution stability, and fracture strength. Alicyclic diisocyanates, such as isophorones, are preferred for obtaining polyurethanes that exhibit anti-yellowing properties and are not easily discolored upon exposure to sunlight.

The resins or prepolymers suitable for use in the coating can be produced using suitable chain extenders. These include, but are not limited to, water; low-molecular diols, such as ethylene glycol and propylene glycol; aliphatic diamines, such as ethylenediamine; aromatic diamines, such as 4,4'-diaminodiphenylmethane; alicyclic diamines, such as 4,4'-diaminodicyclohexylmethane and isophoronediamine; alkanolamines, such as ethanolamine; hydrazines; and dihydrazides, such as succinic dihydrazide. Among the aforementioned chain extenders, the diamine compounds are preferable, with 4,4'-diaminodiphenylmethane being particularly preferred due to its heat resistance and 4,4'-diaminodicyclohexylmethane being preferred for light resistance. The aforementioned chain extenders can, of course, be used alone or in any suitable combination.

Other resins or polymers can be used in combinations with the aforementioned resins. Thus, in certain embodiments, the coating can comprise one or more polymers or resins selected from the group consisting of polyvinyl chloride (PVC), polyvinylidene chloride, polyvinyl acetate, polyacrylic acid, alkylpolyacrylate, polymethacrylic acid, alkylpolymethacrylate, and copolymers thereof.

The colorant in the coating can be any suitable polymeric colorant. As utilized herein, the term "polymeric colorant" is used to refer to a colorant comprising a chromophore and an oligomeric constituent bound to the chromophore. The oligomeric constituent can be bound to the chromophore via any suitable means, such as a covalent bond, an ionic bond, or suitable electrostatic interaction. The oligomeric constituent can have any suitable formula weight. As utilized herein in reference to the oligomeric constituent, the term "formula weight" refers to the weight (in grams) of the oligomeric constituent per mole of the polymeric colorant. In other words, the "formula weight" of the oligomeric constituent refers to the portion of the polymeric colorant's molecular weight attributable to the oligomeric constituent (the remainder being attributable to the chromophore and any groups attached thereto). Typically, the oligomeric constituent has a formula weight of about 40 or more. The oligomeric constituent typically has a formula weight of about 3,000 or less. In certain possibly preferred embodiments, the oligomeric constituent has a formula weight of about 40 to about 3,000.

Suitable polymeric colorants include, but are not limited to, those polymeric colorants conforming to structure (I) or structure (III)

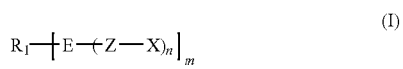

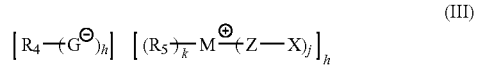

In structure (I), $R_1$ or $R_1$-E together represents an organic chromophore. E is a linking moiety selected from the group consisting of nitrogen, oxygen, sulfur, a sulfite group, a sulfonamide group, and a carboxyl group. Also, n and m are independently selected from the group consisting of integers between 1 and 5. In structure (III), $R_4$ or $R_4(G)_h$ represents an organic chromophore. G is selected from the group consisting of $SO_3^-$ (a sulfite anion) and $CO_2^-$ (a carboxylate anion). Each $R_5$ is independently selected from the group consisting of hydrogen, alkyl groups, and aryl groups, and M is selected from the group consisting of nitrogen atoms and phosphorous atoms. Also, h is an integer between 1 and 4, k is an integer between 0 and 5, and j is an integer between 1 and 6. The sum of k and j is equal to 4 when M is a nitrogen atom, and the sum of k and j is equal to 6 when M is a phosphorous atom.

In each of structures (I) and (III), X is an end group independently selected from the group consisting of hydrogen, hydroxyl groups, thiol groups, amine groups, alkyl groups, aryl groups, alkyl ester groups, aryl ester groups, organic sulfonate groups, organic sulfate groups, and amide groups. Also, each Z in the structures is an oligomeric constituent independently selected from the group consisting of (i) oligomers comprising at least three monomers selected from the group consisting of $C_2$-$C_{20}$ alkyleneoxy groups, glycidol groups, and glycidyl groups, (ii) aliphatic oligomeric esters conforming to structure (II)

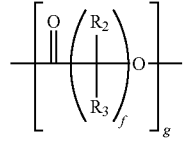

and (iii) combinations of (i) and (ii). In structure (II), $R_2$ and $R_3$ are independently selected from the group consisting of hydrogen and $C_1$-$C_{10}$ alkyl groups, f is an integer between 1 and 10, and g is any positive integer or fraction between 1 and 20. As will be understood by those of ordinary skill in the art, suitable values for g include both integers and fractions because the length of the oligomeric constituent on the polymeric colorant molecules may vary. Thus, the value for g represents an average length of the ester chain for a given sample or collection of polymeric colorant molecules.

An example of suitable polymeric colorants conforming to structure (I) include methine-based colorants, such as those colorants conforming to structure (IV)

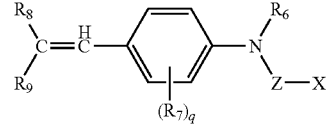

In structure (IV), $R_6$ is selected from the group consisting of hydrogen, alkyl groups, aryl groups, arylalkyl groups, alkylaryl groups, and oligomeric constituents having the structure -Z-X. Each $R_7$ is independently selected from the group consisting of hydrogen, halogen atoms, alkyl groups, alkoxy groups, nitrile groups, nitro groups, amide groups, and sulfonamide groups, and q is an integer between 0 and 4. $R_8$ and $R_9$ are independently selected from the group consisting of hydrogen, halogen atoms, tertiary amino groups, imine groups, cyano groups, pyridinium groups, ester groups, amide groups, sulfate groups, sulfonate groups, sulfide groups, sulfoxide groups, phosphine groups, phosphinium groups, phosphate groups, nitrile groups, mercapto groups, nitro groups, sulfone groups, acyl groups, azo groups, alkyl groups, alkoxy groups, aryl groups, aryloxy groups, arylalkyl groups, arylalkoxy groups, alkylaryl groups, and alkylaryloxy groups.

More specific examples of methine-based polymeric colorants suitable for use in the synthetic leather articles include those polymeric colorants conforming to structure (IX)

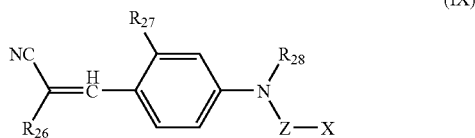
(IX)

In structure (IX), $R_{26}$ is selected from the group consisting of cyano groups, nitro groups, alkylcarbonyl groups, arylalkylcarbonyl groups, alkoxycarbonyl groups, arylalkoxycarbonyl groups, amide groups, and alkylamide groups. $R_{27}$ is selected from the group consisting of hydrogen, $C_1$-$C_{20}$ alkyl groups, and $C_7$-$C_{20}$ arylalkyl groups. $R_{28}$ is selected from the group consisting of hydrogen, $C_1$-$C_{20}$ alkyl groups, aryl groups, $C_7$-$C_{20}$ arylalkyl groups, $C_7$-$C_{20}$ alkylaryl groups, and oligomeric constituents having the structure -Z-X. Z is an oligomeric constituent comprising at least three monomers selected from the group consisting of $C_2$-$C_{20}$ alkyleneoxy groups (e.g., ethylene oxide, propylene oxide, butylene oxide), glycidol groups, and glycidyl groups. In certain possibly preferred embodiments of the methine-based colorants conforming to structure (IX), $R_{26}$ is a cyano group or a $C_1$-$C_{10}$ alkylcarbonyl group, $R_{27}$ is hydrogen or a methyl group, $R_{28}$ is an oligomeric constituent having the structure -Z-X, and Z is an oligomeric constituent comprising at least three monomers selected from the group consisting of $C_2$-$C_{20}$ alkyleneoxy groups (e.g., ethylene oxide, propylene oxide, butylene oxide), glycidol groups, and glycidyl groups.

Another example of suitable polymeric colorants conforming to structure (I) include azo-based colorants, such as those colorants conforming to structure (V)

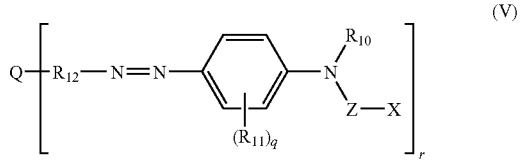
(V)

In structure (V), $R_{10}$ is selected from the group consisting of hydrogen, alkyl groups, aryl groups, arylalkyl groups, alkylaryl groups, and oligomeric constituents having the structure -Z-X. Each $R_{11}$ is independently selected from the group consisting of hydrogen, halogen atoms, alkyl groups, alkoxy groups, nitrile groups, nitro groups, amide groups, and sulfonamide groups, and q is an integer between 0 and 4. $R_{12}$ is selected from the group consisting of aromatic groups and heteroatom-containing aromatic groups. Q is hydrogen or a linking group selected from the group consisting of oxygen, sulfur, a carbonyl group, a sulfonyl group, a $C_1$-$C_8$ alkyl group, a $C_2$-$C_8$ alkene group, a p-phenylenediamine group, a m-hydroxybenzene group, and a m-di($C_1$-$C_4$) alkoxybenzene, and r is equal to 1 or 2.

More specific examples of azo-based polymeric colorants suitable for use in the synthetic leather articles include those polymeric colorants conforming to structure (X)

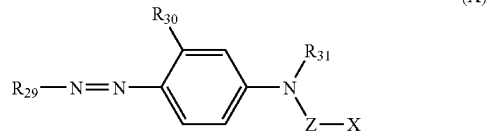
(X)

In structure (X), $R_{29}$ is selected from the group consisting of aromatic groups and heteroatom-containing aromatic groups. $R_{30}$ is selected from the group consisting of hydrogen, $C_1$-$C_{20}$ alkyl groups, and $C_7$-$C_{20}$ arylalkyl groups. $R_{31}$ is selected from the group consisting of hydrogen, $C_1$-$C_{20}$ alkyl groups, aryl groups, $C_7$-$C_{20}$ arylalkyl groups, $C_7$-$C_{20}$ alkylaryl groups, and oligomeric constituents having the structure -Z-X. Z is an oligomeric constituent comprising at least three monomers selected from the group consisting of $C_2$-$C_{20}$ alkyleneoxy groups (e.g., ethylene oxide, propylene oxide, butylene oxide), glycidol groups, and glycidyl groups. In certain possibly preferred embodiments of the azo-based colorants conforming to structure (X), $R_{29}$ is an aromatic group or a heteroatom-containing aromatic group, $R_{30}$ is a hydrogen or a methyl group, $R_{31}$ is an oligomeric constituent having the structure -Z-X, and Z is an oligomeric constituent comprising at least three monomers selected from the group consisting of $C_2$-$C_{20}$ alkyleneoxy groups (e.g., ethylene oxide, propylene oxide, butylene oxide), glycidol groups, and glycidyl groups.

Azo-based colorants suitable for use in the synthetic leather articles include bisazo-based colorants such as those conforming to structure (XI)

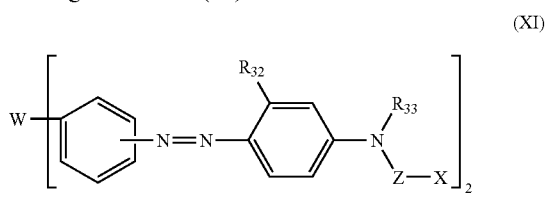
(XI)

In structure (XI), W is a linking group and is selected from the group consisting of oxygen, sulfur, a sulfone group, a carbonyl group, $C_1$-$C_8$ alkyl groups, $C_2$-$C_8$ alkylene groups, and p-phenylenediamine. $R_{32}$ is selected from the group consisting of hydrogen, $C_1$-$C_{20}$ alkyl groups, and $C_7$-$C_{20}$ arylalkyl groups. $R_{33}$ is selected from the group consisting of hydrogen, $C_1$-$C_{20}$ alkyl groups, aryl groups, $C_7$-$C_{20}$ arylalkyl groups, $C_7$-$C_{20}$ alkylaryl groups, and oligomeric constituents having the structure -Z-X. Z is an oligomeric constituent comprising at least three monomers selected from the group consisting of $C_2$-$C_{20}$ alkyleneoxy groups (e.g., ethylene oxide, propylene oxide, butylene oxide), glycidol groups, and glycidyl groups. In certain possibly preferred embodiments of the bisazo-based colorants conforming to structure (XI), W is a sulfone group, $R_{32}$ is hydrogen or a methyl group, $R_{33}$ is an oligomeric constituent having the structure -Z-X, and Z is an oligomeric constituent comprising at least three monomers selected from the group consisting of $C_2$-$C_{20}$ alkyleneoxy groups (e.g., ethylene oxide, propylene oxide, butylene oxide), glycidol groups, and glycidyl groups.

Suitable polymeric colorants conforming to structure (I) also include triphenylmethane-based colorants, such as those colorants conforming to structure (VI)

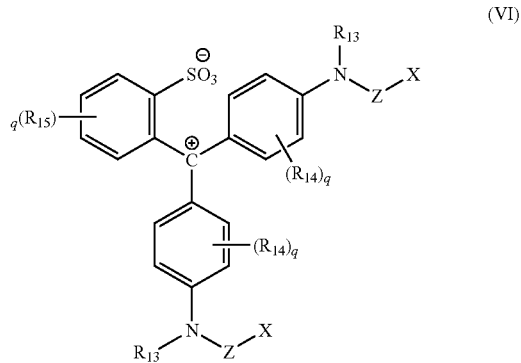

(VI)

$R_{13}$ is selected from the group consisting of hydrogen, alkyl groups, aryl groups, arylalkyl groups, alkylaryl groups, and oligomeric constituents having the structure -Z-X. $R_{14}$ is selected from the group consisting of hydrogen, halogen atoms, alkyl groups, alkoxy groups, alkylamino groups, and arylamino groups. $R_{15}$ is selected from the group consisting of hydrogen, halogen atoms, alkyl groups, alkoxy groups, alkylamino groups, arylamino groups, cyano groups, nitro groups, amide groups, sulfite groups, and sulfonamide groups, and each q is an integer between 0 and 4.

More specific examples of triphenylmethane-based polymeric colorants suitable for use in the synthetic leather articles include those polymeric colorants conforming to structure (XII)

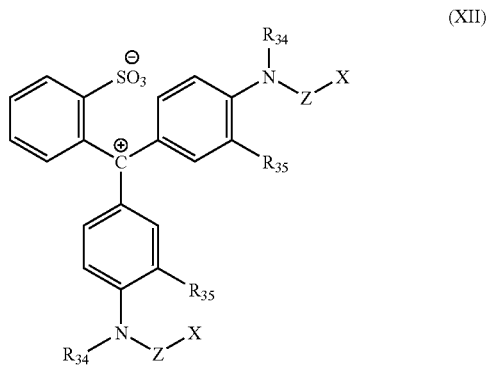

(XII)

In structure (XII), $R_{35}$ is selected from the group consisting of hydrogen, halogen atoms, alkyl groups, alkoxy groups, alkylamino groups, and arylamino groups. $R_{34}$ is selected from the group consisting of hydrogen, alkyl groups, aryl groups, arylalkyl groups, alkylaryl groups, and oligomeric constituents having the structure -Z-X. Alternatively, $R_{35}$ can be joined to $R_{34}$ to form a ring. Z is an oligomeric constituent comprising at least three monomers selected from the group consisting of $C_2$-$C_{20}$ alkyleneoxy groups (e.g., ethylene oxide, propylene oxide, butylene oxide), glycidol groups, and glycidyl groups. In certain possibly preferred embodiments of the triphenylmethane-based colorants conforming to structure (XII), $R_{35}$ is hydrogen, $R_{34}$ is an oligomeric constituent having the structure -Z-X, and Z is an oligomeric constituent comprising at least three monomers selected from the group consisting of $C_2$-$C_{20}$ alkyleneoxy groups (e.g., ethylene oxide, propylene oxide, butylene oxide), glycidol groups, and glycidyl groups.

Suitable polymeric colorants conforming to structure (I) further include benzodifuranone-based colorants, such as those colorants conforming to structure (VII)

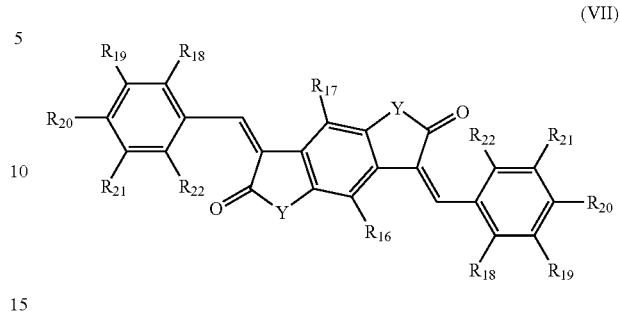

(VII)

In structure (VII), Y is selected from the group consisting of oxygen, sulfur, and $NR_{40}$, where $R_{40}$ is selected from the group consisting of hydrogen, alkyl groups, and aryl groups. $R_{16}$ and $R_{17}$ are independently selected from the group consisting of hydrogen, halogen atoms, hydroxyl groups, alkyl groups, alkenyl groups, and alkoxy groups. $R_{18}$, $R_{19}$, $R_{20}$, $R_{21}$, and $R_{22}$ are independently selected from the group consisting of hydrogen, halogen atoms, $C_1$-$C_{20}$ alkyl groups, $C_1$-$C_{20}$ alkylester groups, hydroxyl groups, thio groups, cyano groups, sulfonyl groups, sulfo groups, sulfato groups, aryl groups, nitro groups, carboxyl groups, $C_1$-$C_{20}$ alkoxy groups, $C_1$-$C_{20}$ alkylamino groups, acrylamino groups, $C_1$-$C_{20}$ alkylthio groups, $C_1$-$C_{20}$ alkylsulfonyl groups, $C_1$-$C_{20}$ alkylphenyl groups, phosphonyl groups, $C_1$-$C_{20}$ alkylphosphonyl groups, $C_1$-$C_{20}$ alkoxycarbonyl groups, phenylthio groups, and oligomeric constituents having the structure -E-(Z-X)$_n$. At least one of $R_{18}$, $R_{19}$, $R_{20}$, $R_{21}$, and $R_{22}$ is an oligomeric constituent having the structure -E-(Z-X)$_n$.

More specific examples of benzodifuranone-based polymeric colorants suitable for use in the synthetic leather articles include those polymeric colorants conforming to structure (XII)

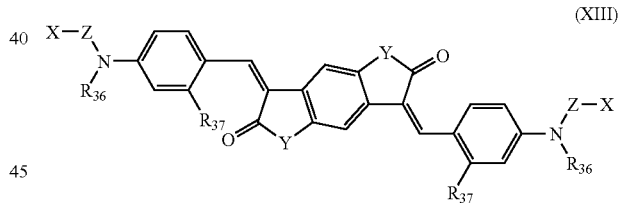

(XIII)

In structure (XIII), $R_{36}$ is selected from the group consisting of hydrogen, alkyl groups, aryl groups, arylalkyl groups, alkylaryl groups, and oligomeric constituents having the structure -Z-X. $R_{37}$ is selected from the group consisting of hydrogen, halogen atoms, alkoxy groups, alkylamino groups, and a groups having the structure —$R_{41}$—C(O)—NH—, where $R_{41}$ is selected from the group consisting of hydrogen, alkyl groups, and aryl groups. Z is an oligomeric constituent comprising at least three monomers selected from the group consisting of $C_2$-$C_{20}$ alkyleneoxy groups (e.g., ethylene oxide, propylene oxide, butylene oxide), glycidol groups, and glycidyl groups. In certain possibly preferred embodiments of the benzodifuranone-based colorants conforming to structure (XIII), $R_{37}$ is hydrogen or a methyl group, $R_{36}$ is an oligomeric constituent having the structure -Z-X, and Z is an oligomeric constituent comprising at least three monomers selected from the group consisting of $C_2$-$C_{20}$ alkyleneoxy groups (e.g., ethylene oxide, propylene oxide, butylene oxide), glycidol groups, and glycidyl groups.

Another example of suitable polymeric colorants conforming to structure (I) include anthraquinone-based colorants, such as those colorants conforming to structure (VIII)

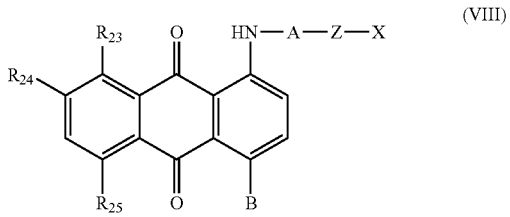

(VIII)

In structure (VIII), $R_{23}$ is selected from the group consisting of hydrogen, halogen atoms, hydroxyl groups, amine groups, nitro groups, and acetamide groups. $R_{24}$ and $R_{25}$ are independently selected from the group consisting of hydrogen and hydroxyl groups, and A is selected from the group consisting of alkyl groups and aryl groups. B is selected from the group consisting of groups conforming to structure (XV) and structure (XVI)

(XV)

(XVI)

In structure (XV), $R_{38}$ is selected from the group consisting of hydrogen, $C_1$-$C_{18}$ alkyl groups, and aryl groups. In structure (XVI), $R_{39}$ is selected from the group consisting of aryl groups and oligomeric constituents having the structure -A-Z-X.

More specific examples of anthraquinone-based polymeric colorants suitable for use in the synthetic leather articles include those polymeric colorants conforming to structure (XIV)

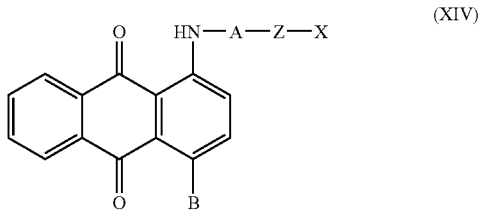

(XIV)

In structure (XIV), A is selected from the group consisting of alkyl groups and aryl groups, and B is selected from the group consisting of groups conforming to structure (XV) and structure (XVI)

(XV)

(XVI)

In structure (XV), $R_{38}$ is selected from the group consisting of hydrogen, $C_1$-$C_{18}$ alkyl groups, and aryl groups. In structure (XVI), $R_{39}$ is selected from the group consisting of aryl groups and oligomeric constituents having the structure -A-Z-X. In certain possibly preferred colorants conforming to structure (XIV), A is selected from the group consisting of alkyl groups and aryl groups, and B is a group having the structure —NH—$R_{39}$.

Suitable polymeric colorants conforming to structure (III) include phthalocyanine-based polymeric colorants in which $R_4$ is a metal phthalocyanine derivative. In certain possibly preferred embodiments of the polymeric colorants conforming to structure (III), $R_4$ is a copper phthalocyanine chromophore, G is a sulfite group, h, j, and k are equal to 2, $R_5$ is a $C_1$-$C_{20}$ alkyl group, M is a nitrogen, and Z is an oligomeric constituent comprising at least three monomers selected from the group consisting of $C_2$-$C_{20}$ alkyleneoxy groups (e.g., ethylene oxide, propylene oxide, butylene oxide), glycidol groups, and glycidyl groups.

The selection of a suitable polymeric colorant can be based on several factors. For example, when the polymeric colorant is used to produce a colored polyurethane prepolymer, the polymeric colorant preferably comprises oligomer or polymer chains that terminate with groups containing active hydrogen, such as a hydroxyl group, a thiol group, or an amine group. This active hydrogen allows such polymeric colorants to be reacted with a suitable isocyanate-containing compound, thereby producing a colored prepolymer. This colored prepolymer can then be further reacted to produce a colored synthetic leather article according to the invention. When directly used with polyurethane resin solution or dispersion to produce synthetic leather, the compatibility of the polymeric colorant with the resin is more important than the reactivity of polymer chain terminal groups. In other words, the terminal group X is not believed to be critical with regard to the functioning of the polymeric colorant when the polymeric colorant is merely dispersed in the resin of the synthetic leather article.

The polymeric colorants can be present in the synthetic leather articles of the invention in any suitable amount. Generally, the amount of the polymeric colorants employed in a colored polyurethane prepolymer or synthetic leather article depends upon the desired shade and depth of color. Other factors may include whether or not other coloring agents are employed, such as dyes and/or pigments. When used to produce polyurethane prepolymers, the molar ratio of isocyanate/OH from the polymeric colorant(s) needs to be taken into account to adjust the loading of polyols since some polymeric colorants contain hydroxyl group(s). Another factor to consider is whether the polymeric colorants are used in the base layers or the skin coat layer. The amount of the polymeric colorant(s) employed is not limited to a specific weight range. However, to produce a colored polyurethane prepolymer, the polymeric colorant(s) can be used in an amount of about 0.01 to 40% by weight, and may also be in the range of about 0.1 to about 15% by weight, with respect to the requirement of targeted color shade or depth or physical properties of the prepolymer to be made. To produce colored synthetic leather compositions using uncolored commercial prepolymers, the polymeric colorant(s) can be used in an amount of about 0.01 to 15% by weight, preferably 0.1 to 5% by weight, depending upon the compatibility of the polymeric colorant with the polyurethane resin, and color shade and depth desired for the leather article.

The flexibility of the oligomer or polymer chain(s) of the polymeric colorants may be designed or modified to be compatible with almost any polymer resins and prepolymers, thus enabling a wide selection of isocyanates and polyols to be chosen to make polyurethane/polyurea resins or prepolymers, and/or other elastic polymers to be used with polyurethane/polyurea resins to achieve desired physical or chemical properties for the colored synthetic leather articles. Colored synthetic leather articles containing polymeric colorants generally exhibit low to no bleeding and migration, for example, to the release paper. While not wishing to be bound to any particular theory, this is believed to be due to either the compatibility between the colorants and the resin(s) employed or covalent bonding of the polymeric colorant(s) with the resin. The liquid or paste nature of the polymeric colorants may also facilitate the colored synthetic leather manufacturing process by eliminating the problems associated with handling large amounts of solids, such as the pigments typically used to produce synthetic leathers. The polymeric colorants' liquid or paste nature and compatibility with the resins may also shorten the amount of time needed to satisfactorily mix the colorants with the resins or prepolymers, as compared to the mixing times required when dyes or pigments are used.

The inherent characteristics of the polymeric colorants, such as the liquid or paste nature and the compatibility of the polymeric colorants with each other, may enable one to freely blend several different polymeric colorants in several different amounts, without the need to use external solvents. The ability to freely blend the polymeric colorants can enable one to produce almost any desirable color shades, which are otherwise extremely difficult to achieve using conventional dyes or pigments. Thus, for example, by using only 5 polymeric colorants, such as a yellow colorant, an orange colorant, a red colorant, a violet colorant, and a blue colorant, one can achieve a much broader color space than that produced using conventional dyes and/or pigments. In one scenario, for example, a synthetic leather manufacturer need only stock 5 different polymeric colorants to produce a wide variety of desired color shades and brightness for synthetic leather articles. Thus, the inherent characteristics of the polymeric colorants may enable the colored synthetic leather articles according to the invention to achieve a much broader and/or brighter color shade than those previously obtained using conventional dyes and/or pigments.

Furthermore, the relatively high water solubility of the polymeric colorants may enable the manufacturing equipment used to produce a synthetic leather article according to the invention to be cleaned more easily than equipment used to produce synthetic leather using conventional dyes and/or pigments. This easy clean-up may enable the synthetic leather articles according to the invention to be produced in a more cost effective manufacturing process as compared to conventional manufacturing processes using conventional dyes and/or pigments.

In addition to the above-described polymeric colorants, other coloring agents can be incorporated into the synthetic leather article in order to control the color hue. These coloring agents include conventionally known pigments and dyes. Examples of blue pigments include, but are not limited to, phthalocyanine C.I. Pigment Blue 15:3 and indanthrone C.I. Pigment Blue 60; examples of red pigments include, but are not limited to, quinacridone C.I. Pigment Red 122, azo C.I. Pigment Red 22, C.I. Pigment Red 48:1, C.I. Pigment Red 48:3 and C.I. Pigment Red 57:1; examples of yellow pigments include, but are not limited to, azo C.I. Pigment Yellow 12, C.I. Pigment Yellow 13, C.I. Pigment Yellow 14, C.I. Pigment Yellow 17, C.I. Pigment Yellow 97, C.I. Pigment Yellow 155, benzimidazolone C.I. Pigment Yellow 151, C.I. Pigment Yellow 154 and C.I. Pigment Yellow 180; examples of black pigments include, but are not limited to, carbon black. Examples of suitable dyes include, but are not limited to, solvent dyes, such as Yellow 82, Orange 5, Orange 62, Red 8, Red 62, Red 122, Blue 70, Black 27, and Black 34. For ease of handling and mixing in the production of the synthetic leather articles, any pigments used preferably are in added in the form of a dispersion or in resin pallet/flake forms, and any dyes used preferably are added in the form of a in solution or in resin pallet/flake forms.

The synthetic leather articles of the invention can be produced using any suitable method. For example, the synthetic leather articles can be produced using both "a direct coating process" and "a transfer coating process", or "dry" and "wet" methods. In two-component technologies, polymeric colorants preferably are mixed with polyols to react with isocyanates to form a high viscosity isocyanate- or hydroxyl-terminated prepolymer. This prepolymer can then be directly coated onto a substrate or onto transfer substrate (e.g., release paper) using a doctor blade and cured by respective curing methods. If a free resin film is produced, the film then needs to be laminated to a textile substrate in a subsequent step. In one-component technologies using commercially available polyurethane or polyurea resins, the resin can be used in the form of a solvent solution ("solvent method"), or the resin can be in the form of an aqueous dispersion ("aqueous method"). In the solvent method, the polymeric colorant(s) preferably are thoroughly mixed with a polyurethane solution in polar solvents, such as dimethylformamide (DMF) and/or methyl ethyl ketone (MEK). The high viscosity solution is then spread onto a carrier or release paper, and the material is oven dried and laminated onto a substrate to form a synthetic leather article. In the aqueous method, the polymeric colorant(s) preferably are thoroughly mixed with an aqueous polyurethane dispersion (PUD) to form an aqueous emulsion. A suitable substrate is then impregnated with the emulsion, and the coated substrate is dried and cured to produce a synthetic leather article.

In a first method embodiment, the invention provides a method for producing a synthetic leather article comprising the steps of (a) providing a resin or prepolymer, (b) providing a polymeric colorant, (c) mixing the polymer colorant and the resin or prepolymer to form a mixture, (d) applying the mixture obtained in step (c) onto a transfer substrate and heating the substrate to dry the substrate and form a resin coating thereon, (e) applying an adhesive onto the resin coating produced in step (d), (f) applying a backing substrate to the adhesive layer produced in step (e), (g) heating the assembly produced in step (f) to dry the assembly and bond the fibrous backing substrate to the adhesive layer, and (h) removing the transfer substrate from the assembly produced in (g) to produce a synthetic leather article.

The substrate, resin or prepolymer, and polymeric colorant used in the first method embodiment can be any suitable substrate, resin or prepolymer, and polymeric colorant, including those described above with respect to the synthetic leather articles according to the invention. The transfer substrate used in the first method embodiment can be any substrate that permits the formation of a resin coating thereon, while still enabling that resin coating to be released from the substrate without damaging the coating. Suitable transfer substrates include, but are not limited to, a release paper, such as a silicone-treated, mirror-surface release paper.

In accordance with the first method embodiment, a synthetic leather article can be produced, for example, by thoroughly mixing a polyurethane resin solution in methyl ethyl ketone/dimethylformamide with at least one polymeric colorant and, optionally, with other additives. The mixture is then directly coated onto a release paper. After evaporating the solvent by oven drying or other drying process to produce a resin coating on the release paper, a thin layer of adhesive is applied onto the resin coating. A suitable substrate is then applied to the adhesive layer, and the resulting assembly is heated. The release paper is then peeled off of the assembly to reveal a synthetic leather article. Furthermore, due to the lack of or minimal color migration resulting from the use of the polymeric colorants, the release paper typically is not discolored by the colorants employed and, therefore, can be reused.

In a second method embodiment, the invention provides a method for producing a synthetic leather article comprising the steps of (a) providing a resin or prepolymer, (b) providing a polymeric colorant, (c) mixing the polymer colorant and the resin or prepolymer to form a mixture, (d) applying the mixture obtained in step (c) onto a backing substrate, (e) immersing the coated substrate obtained in step (d) in an aqueous solution to cure the resin or prepolymer and form a coating on the surface thereof, (f) removing the substrate from the aqueous solution, and (g) heating the substrate to dry the substrate and produce a synthetic leather article.

The substrate, resin or prepolymer, and polymeric colorant used in the second method embodiment can be any suitable substrate, resin or prepolymer, and polymeric colorant, including those described above with respect to the synthetic leather articles according to the invention.

In accordance with the second method embodiment, a synthetic leather article can be produced, for example, by thoroughly mixing a polyurethane resin or prepolymer solution in dimethylformamide with at least one polymeric colorant and, optionally, with other additives. The mixture is then coated onto a suitable substrate, and the coated substrate is then immersed in an aqueous medium. While immersed in the aqueous medium, the solvent (e.g., dimethylformamide) is extracted from the mixture, which causes the polymer in the mixture to coagulate and form a film. The resulting substrate is then dried to produce a synthetic leather article.

The following examples further illustrate the invention but, of course, should not be construed as in any way limiting its scope.

EXAMPLE 1

This example demonstrates the production of a synthetic leather article in accordance with the invention. 70 parts (0.14 mol) of Fomrez® polyester polyol (available from Witco) having a molecular weight of 500 and an OH number of 225, 48 parts (0.04 mol) of Millijet® Red 17 polymeric colorant (available from Milliken Chemical) which had been diluted to a color value of 30 abs./g/L, 32 parts (0.36 mol) of 1,4-butyleneglycol, and 374 parts of dimethylformamide (DMF) were charged into a 3-neck flask equipped with a reflux condenser, a mechanical stirrer, and a thermo-controller. With vigorous stirring, 136 parts (0.54 mol) of diphenylmethane-4,4'-diisocyanate was slowly added. After stirring for 15 minutes, 300 parts of DMF was added and the whole mixture was then heated to approximately 90-100° C. for 1.5 hours to complete the reaction. The resulting product was then diluted with DMF to form a red viscous polyurethane solution having a 25% solids content.

The red polyurethane solution was then applied to a commercially available fabric substrate to form a coating of the substrate having a thickness of 2 mm. The coated substrate was then soaked in an aqueous bath containing 4% by weight of DMF and kept at 30° C. for 5 minutes to coagulate the coating layer. The coated fabric was then soaked in warm water at approximately 50-60° C. for 40 minutes to extract the DMF, squeezed and dried at 100° C. for 20 minutes. A red synthetic leather was obtained.

EXAMPLE 2

This example demonstrates the production of a synthetic leather article in accordance with the invention. The procedure of Example 1 was repeated except that the red polymeric colorant was replaced with 60 parts of Millijet® Violet 82 polymeric colorant (available from Milliken Chemical) which had been diluted to a color value of 24 abs./g/L. The process produced a violet synthetic leather.

EXAMPLE 3

This example demonstrates the production of a synthetic leather article in accordance with the invention. The procedure of Example 1 was repeated except that the Fomrez® polyester polyol was replaced with 74 parts of Tone® Polyol 0201 polyester polyol (available from Dow), which had a molecular weight of 530 and an OH number of 210. The red polyurethane solution obtained had a solids content of 25%, and the process produced a red synthetic leather.

EXAMPLE 4

This example demonstrates the production of a synthetic leather article in accordance with the invention. The procedure of Example 3 was repeated except that the red polymeric colorant was replaced with 60 parts of Millijet® Violet 82 polymeric colorant (available from Milliken Chemical) which had been diluted to a color value of 24 abs./g/L. The process produced a violet synthetic leather.

EXAMPLE 5

This example demonstrates the production of a synthetic leather article in accordance with the invention. The procedure of Example 1 was repeated except that the Fomrez® polyester polyol was replaced with 116 parts of Tone® Polyol 0210 polyester polyol (available from Dow), which had a molecular weight of 830 and an OH number of 135. The red polyurethane solution obtained had a solids content of 25%, and the process produced a red synthetic leather.

EXAMPLE 6

This example demonstrates the production of synthetic leather articles in accordance with the invention. 70 parts (0.14 mol) of Fomrez® polyester polyol (available from Witco) having a molecular weight of 500 and an OH number of 225, 48 parts (0.04 mol) of Millijet® Red 17 polymeric colorant (available from Milliken Chemical) which had been diluted to a color value of 30 abs./g/L, 32 parts (0.36 mol) of 1,4-butyleneglycol, and 374 parts of dimethylformamide (DMF) were charged into a 3-neck flask equipped with a reflux condenser, a mechanical stirrer, and a thermo-controller. With vigorous stirring, 152 parts (0.61 mol) of diphenylmethane-4,4'-diisocyanate was slowly added (the [NCO]/[OH] ratio being 1.12). After stirring for 15 minutes, 300 parts of DMF was added and the whole mixture was then heated to approximately 90-100° C. for 1.5 hours to complete the reaction. The resulting product was then diluted with DMF to form a red viscous polyurethane resin/prepolymer solution having a 25% solids content and a 12.2% (molarity) excess of free isocyanate.

In a first method for producing a synthetic leather article, the red polyurethane resin/prepolymer solution was directly applied onto a commercially available silicone-treated, mirror-surface release paper to form a film coating having a thickness of approximately 15 microns. A commercially available base substrate having a thickness of 1 mm (a nonwoven fibrous sheet having a thickness of 80 microns and a polyurethane elastomer impregnated/coated and solidified on one side) was then pressed/bonded onto this film coating. Then, the assembly was heated to a temperature of approximately 120° C. in an oven and kept at that temperature for 3 minutes. The assembly was then removed from the oven and cooled down to room temperature, and the release paper was then peeled off of the assembly. A synthetic leather article having a red skin layer was thus obtained. Furthermore, no visible red color was detected on the release paper, which suggests that none of the red colorant had migrated onto the release paper.

In a second method for producing a synthetic leather article, the red polyurethane resin/prepolymer solution was applied to a commercially available fabric substrate to form a film coating having a thickness of 2 mm. The coated substrate was then soaked in an aqueous bath containing 4% by weight of DMF and kept at 30° C. for 5 minutes to coagulate the coating layer. The coated fabric was then soaked in warm water at 50-60° C. for 40 minutes to extract the DMF, squeezed and dried at 100° C. for 20 minutes. A red synthetic leather was obtained.

EXAMPLE 7

This example demonstrates the production of synthetic leather articles in accordance with the invention. The procedure of Example 6 was followed except that the Fomrez® polyester polyol was replaced with 74 parts of Tone® Polyol 0201 polyester polyol (available from Dow), which had a molecular weight of 530 and an OH number of 210. A red, viscous polyurethane resin/prepolymer solution having a 25% solids content and a 12.2% (molarity) excess of free isocyanate was obtained.

The resulting polyurethane resin/prepolymer solution was then used to produce red synthetic leather articles in accordance with the first and second methods described in Example 6. As in the first method described in Example 6, the release paper used to produce the synthetic leather article did not show visible signs of color migration.

EXAMPLE 8

This example demonstrates the production of synthetic leather articles in accordance with the invention. The procedure of Example 6 was followed except that the Fomrez® polyester polyol was replaced with 116 parts of Tone® Polyol 0210 polyester polyol (available from Dow), which had a molecular weight of 830 and an OH number of 135. The red, viscous polyurethane resin/prepolymer solution obtained had a solids content of 25% and a 12.2% (molarity) excess of free isocyanate.

The resulting polyurethane resin/prepolymer solution was then used to produce red synthetic leather articles in accordance with the first and second methods described in Example 6. As in the first method described in Example 6, the release paper used to produce the synthetic leather article did not show visible signs of color migration.

EXAMPLE 9

This example demonstrates the production of a synthetic leather article in accordance with the invention. 74 parts (0.14 mol) of Tone® 0201 polyester polyol (available from DOW) having a molecular weight of 530 and an OH number of 210, 48 parts (0.04 mol) of Millijet® Red 17 polymeric colorant (available from Milliken Chemical) which had been diluted to a color value of 30 abs./g/L, 32 parts (0.36 mol) of 1,4-butyleneglycol, and 374 parts of dimethylformamide (DMF) were charged into a 3-neck flask equipped with a reflux condenser, a mechanical stirrer, and a thermo-controller. With vigorous stirring, 152 parts (0.61 mol) of diphenylmethane-4,4'-diisocyanate was slowly added (the [NCO]/[OH] ratio being 1.12). After stirring for 15 minutes, 300 parts of DMF was added and the whole mixture was then heated to approximately 90-100° C. for 1.5 hours to complete the reaction. After the mixture had cooled to approximately 70° C., a solution containing 2.2 parts of methanol in 10 parts DMF was added to the mixture, and the resulting mixture was maintained at a temperature of approximately 70° C. for 20 minutes. The resulting product was then diluted with DMF to form a red, viscous polyurethane resin/prepolymer having a 25% solids content and a 6% (molarity) excess of free isocyanate.

The red polyurethane resin/prepolymer solution was then directly applied onto a commercially available silicone-treated, mirror-surface release paper to form a film coating having a thickness of approximately 0.15 mm. Onto this coating layer a commercially available base substrate having a thickness of 1 mm (a non-woven fibrous sheet having a thickness of 80 microns and a polyurethane elastomer impregnated/coated and solidified on one side) was pressed/bonded. Then, the assembly was heated to a temperature of approximately 120° C. in an oven and kept at that temperature for 3 minutes. The assembly was then removed from the oven and cooled to room temperature, and the release paper was then peeled off of the assembly. A synthetic leather having a red skin layer was thus obtained. Furthermore, no visible red color was detected on the release paper, which suggested that none of the red colorant had migrated onto the release paper.

EXAMPLE 10

This example demonstrates the production of a synthetic leather article in accordance with the invention. 116 parts (0.14 mol) of Tone® 0210 polyester polyol (available from DOW) having a molecular weight of 830 and an OH number of 135, 48 parts (0.04 mol) of Millijet® Red 17 polymeric colorant (available from Milliken Chemical) which had been diluted to a color value of 30 abs./g/L, 32 parts (0.36 mol) of 1,4-butyleneglycol, and 374 parts of dimethylformamide (DMF) were charged into a 3-neck flask equipped with a reflux condenser, a mechanical stirrer, and a thermo-controller. With vigorous stirring, 152 parts (0.61 mol) of diphenylmethane-4,4'-diisocyanate was slowly added (the [NCO]/[OH] ratio being 1.12). After stirring for 15 minutes, 300 parts of DMF was added and the whole mixture was then heated to approximately 90-100° C. for 1.5 hours to complete the reaction. After the mixture had cooled to approximately 70° C., a solution containing 4.2 parts (0.135 mol) of methanol in 10 parts DMF was added to the mixture, and the resulting mixture was maintained at a temperature of approximately 70° C. for 20 minutes. The resulting product was then diluted with DMF to form a red, viscous polyurethane resin having a 25% solids content and no excess of free isocyanate.

The red polyurethane resin/prepolymer solution was then directly applied onto a commercially available silicone-treated, mirror-surface release paper to form a film coating having a thickness of approximately 0.15 mm. Onto this coating layer a commercially available base substrate having a thickness of 1 mm (a non-woven fibrous sheet having a thickness of 80 microns and a polyurethane elastomer impregnated/coated and solidified on one side) was pressed/bonded. Then, the assembly was heated to a temperature of approximately 120° C. in an oven and kept at that temperature for 3 minutes. The assembly was then removed from the oven and cooled to room temperature, and the release paper was then peeled off of the assembly. A synthetic leather having a red skin layer was thus obtained. Furthermore, no visible red color was detected on the release paper, which suggested that none of the red colorant had migrated onto the release paper.

EXAMPLE 11

This example demonstrates the production of a synthetic leather article in accordance with the invention. 100 parts of UR-1100 polyurethane resin (available from Home Sun Industrial Co., Ltd. of Taiwan) having a viscosity of 60,000-100,000 centipoises and a solids content of 29-31% in DMF/MEK/toluene, 10 parts of DMF, 90 parts of methyl ethyl ketone (MEK), and 0.3 parts of Millijet® Yellow 26 polymeric colorant (available from Milliken Chemical) which had been diluted to a color value of 27 abs/g/L are added to a beaker. The resulting mixture was vigorously stirred for 10 minutes using a mechanical stirrer to achieve a uniform, yellow, viscous polyurethane solution. A small amount of this yellow polyurethane solution was then directly poured onto a commercially available silicone-treated, mirror-effect release paper and spread out with a 0.12 mm-caved stainless steel drawing rod to form a film coating having a thickness of 0.12 mm. The coated release paper was then placed in an oven at a temperature of approximately 120° C. After approximately 1 minute, the coated release paper was then removed from the oven and cooled to room temperature. The coated release paper was then coated with a PVC forming resin solution using a 0.5 mm-caved drawing rod to form a 0.5 mm PVC film on the surface thereof. The resulting substrate was then placed in an oven at a temperature of approximately 200° C. for approximately 1 minute. After removing the coated release paper from the oven and cooling it to room temperature, an adhesive layer measuring approximately 0.12 mm in thickness was then coated onto the PVC film using a drawing rod. A commercially available base substrate (as described above) was then pressed into the freshly deposited adhesive layer. The resulting assembly was then placed in an oven at a temperature of approximately 120° C. for approximately 1-3 minutes. After the assembly had been removed from the oven and allowed to cool to room temperature, the release paper was removed. A synthetic leather article having a yellow polyurethane skin layer was thus obtained. Furthermore, no visible yellow color was detected on the release paper, which suggests that none of the yellow polymeric colorant had migrated onto the release paper.

COMPARATIVE EXAMPLE 1

A yellow, synthetic leather article was produced in accordance with the procedure described in Example 11, except that the yellow polymeric colorant was replaced with 0.3 parts of a yellow dye solution (30% color strength of C.I. Solvent Yellow 82 in xylene). Upon removal of the release paper, a significant amount of yellow color was observed on the release paper. This suggests that the yellow dye had migrated onto the release paper during the production of the synthetic leather article.

EXAMPLE 12

This example demonstrates the production of a synthetic leather article in accordance with the invention. An orange, synthetic leather article was produced in accordance with the procedure described in Example 11, except that the yellow polymer colorant was replaced with 0.6 parts of Millijet® Orange 31 polymeric colorant (available from Milliken Chemical), which had been diluted to a color value of 18 abs./g/L. As in example 11, no visible color was detected on the release paper after the synthetic leather article had been produced, which suggests that none of the orange polymeric colorant had migrated onto the release paper.

COMPARATIVE EXAMPLE 2

An orange, synthetic leather article was produced in accordance with the procedure described in Example 12, except that the orange polymeric colorant was replaced with 0.6 parts of an orange dye solution (30% color strength of C.I. Solvent Orange 54 in xylene/MEK). Upon removal of the release paper, a significant amount of orange color was observed on the release paper. This suggests that the orange dye had migrated onto the release paper during the production of the synthetic leather article.

EXAMPLE 13

This example demonstrates the production of a synthetic leather article in accordance with the invention. A red, synthetic leather article was produced in accordance with the procedure described in Example 11, except that the yellow polymer colorant was replaced with 0.6 parts of Millijet® Red 17 polymeric colorant (available from Milliken Chemical), which had been diluted to a color value of 30 abs./g/L. After removing the release paper, a slight reddish color was detected on the release paper, which suggests that only a trace amount of the red, polymeric colorant had migrated onto the release paper.

COMPARATIVE EXAMPLE 3

A red, synthetic leather article was produced in accordance with the procedure described in Example 13, except that the red polymeric colorant was replaced with 0.6 parts of a red dye solution (30% color strength of C.I. Solvent Red 8 in xylene/MEK). Upon removal of the release paper, a significant amount of red color was observed on the release paper. This suggests that the red dye had migrated onto the release paper during the production of the synthetic leather article.

EXAMPLE 14

This example demonstrates the production of a synthetic leather article in accordance with the invention. 100 parts of UR-1100 polyurethane resin (available from Home Sun Industrial Co., Ltd. of Taiwan) having a viscosity of 60,000-100,000 centipoises and a solids content of 29-31% in DMF/MEK/toluene, 10 parts of DMF, 90 parts of methyl ethyl ketone (MEK), and 0.3 parts of Millijet® Violet 82 polymeric colorant (available from Milliken Chemical) which had been diluted to a color value of 24 abs./g/L are added to a beaker. The resulting mixture was vigorously stirred for 10 minutes using a mechanical stirrer to achieve a uniform, violet, viscous polyurethane solution. A small amount of this violet polyurethane solution was then directly poured onto a commercially available silicone-treated, mirror-effect release paper and spread out with a 0.12 mm-caved stainless steel drawing rod to form a film coating having a thickness of 0.12 mm. The coated release paper was then placed in an oven at a temperature of approximately 120° C. After approximately 1 minute, the coated release paper was then removed from the oven and cooled to room temperature. An adhesive layer measuring approximately 0.12 mm in thickness was then coated onto the PU film using the same drawing rod. A commercially available base substrate (as described above) was then pressed into the freshly deposited adhesive layer. The resulting assembly was then placed in an oven at a temperature of approximately 120° C. for approximately 1-3 minutes. After the assembly had been removed from the oven and allowed to cool to room temperature, the release paper was removed. A synthetic leather article having a violet polyurethane skin layer was thus obtained. Furthermore, no visible violet color was detected on the release paper, which suggests that none of the violet polymeric colorant had migrated onto the release paper.

EXAMPLE 15

This example demonstrates the production of a synthetic leather article in accordance with the invention. A violet, synthetic leather article was produced in accordance with the procedure described in Example 11, except that the yellow polymer colorant was replaced with 0.3 parts of Millijet® Violet 82 polymeric colorant (available from Milliken Chemical), which had been diluted to a color value of 24 abs./g/L. As in example 11, no visible color was detected on the release paper after the synthetic leather article had been produced, which suggests that none of the violet polymeric colorant had migrated onto the release paper.

EXAMPLE 16

This example demonstrates the production of a synthetic leather article in accordance with the invention. A blue, synthetic leather article was produced in accordance with the procedure described in Example 11, except that the yellow polymer colorant was replaced with 0.6 parts of Millijet® Blue 28 polymeric colorant (available from Milliken Chemical), which had been diluted to a color value of 25 abs./g/L. As in example 11, no visible color was detected on the release paper after the synthetic leather article had been produced, which suggests that none of the blue polymeric colorant had migrated onto the release paper.

COMPARATIVE EXAMPLE 4

A blue, synthetic leather article was produced in accordance with the procedure described in Example 16, except that the blue polymeric colorant was replaced with 0.6 parts of a blue dye solution (30% color strength of C.I. Solvent Blue 70 in xylene/MEK). Upon removal of the release paper, a visible blue color was observed on the release paper. This suggests that the blue dye had migrated onto the release paper during the production of the synthetic leather article.

EXAMPLE 17

This example demonstrates the production of a synthetic leather article in accordance with the invention. A black, synthetic leather article was produced in accordance with the procedure described in Example 11, except that the yellow polymer colorant was replaced with 0.3 parts of a black polymeric colorant. The black polymeric colorant used was obtained by mixing 44% of Millijet® Orange 31 polymeric colorant (available from Milliken Chemical) diluted to a color value of 18 abs./g/L, 28% of Millijet® Violet 82 polymeric colorant (available from Milliken Chemical) diluted to a color value of 24 abs./g/L, and 28% of Millijet® Blue 28 polymeric colorant (available from Milliken Chemical) diluted to a color value of 39 abs./g/L. As in example 11, no visible color was detected on the release paper after the synthetic leather article had been produced, which suggests that none of the polymeric colorants had migrated onto the release paper.

COMPARATIVE EXAMPLE 5

A black, synthetic leather article was produced in accordance with the procedure described in Example 16, except that the black polymeric colorant was replaced with 0.3 parts of a black dye solution (30% color strength of C.I. Solvent Black 27 in xylene/MEK). Upon removal of the release paper, a visible black color was observed on the release paper. This suggests that the black dye had migrated onto the release paper during the production of the synthetic leather article.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A synthetic leather article comprising:
   (a) a fibrous substrate having at least one surface, and
   (b) a coating on the surface of the substrate, the coating comprising:
      (i) a resin selected from the group consisting of polyurethane resins, polyurea resins, and combinations thereof, and
      (ii) a colored polymer dispersed in the resin, the colored polymer comprising a product produced by first reacting at least one polymeric colorant, at least one isocyanate-containing compound, and at least one polyol to produce a first reaction product and then reacting the first reaction product with at least one chain extender, the polymeric colorant comprising a chromophore and an oligomeric constituent bound to the chromophore, and the colored polymer being soluble in polar organic solvents.

2. The article of claim 1, wherein the polymeric colorant is selected from the group of colorants conforming to structure (I) and structure (III)

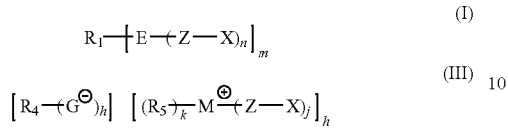

wherein $R_1$ or $R_1$-E is an organic chromophore, E is a linking moiety selected from the group consisting of nitrogen, oxygen, sulfur, a sulfite group, a sulfonamide group, and a carboxyl group, and n and m are independently selected from the group consisting of integers between 1 and 5;

wherein $R_4$ or $R_4(G)_h$ is an organic chromophore, G is selected from the group consisting of $SO_3^-$ and $CO_2^-$, each R5 is independently selected from the group consisting of hydrogen, alkyl groups, and aryl groups, M is selected from the group consisting of nitrogen atoms and phosphorous atoms, h is an integer between 1 and 4, k is an integer between 0 and 5, j is an integer between 1 and 6, and the sum of k and j is equal to 4 when M is a nitrogen atom and 6 when M is a phosphorous atom;

wherein each Z is an oligomeric constituent independently selected from the group consisting of:
  (i) oligomers comprising at least three monomers selected from the group consisting of $C_2$-$C_{20}$ alkyleneoxy groups, glycidol groups, and glycidyl groups,
  (ii) aliphatic oligomeric esters conforming to structure (II)

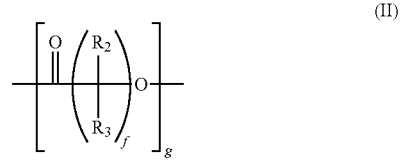

wherein $R_2$ and $R_3$ are independently selected from the group consisting of hydrogen and $C_1$-$C_{10}$ alkyl groups, f is an integer between 1 and 10, and g is any positive integer or fraction between 1 and 20, and
  (iii) combinations of (i) and (ii);

wherein each X is an end group independently selected from the group consisting of hydrogen, hydroxyl groups, thiol groups, amine groups, alkyl groups, aryl groups, alkylester groups, aryl ester groups, organic sulfonate groups, organic sulfate groups, and amide groups.

3. The article of claim 1, wherein the substrate is a textile material selected from the group consisting of woven textiles, knit textiles, and non-wovens.

4. The article of claim 1, wherein the polymeric colorant conforms to structure (IV)

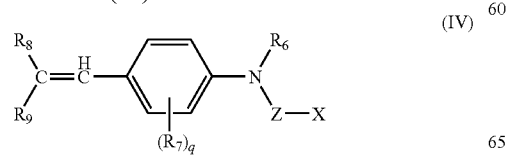

wherein $R_8$ is selected from the group consisting of hydrogen, alkyl groups, aryl groups, arylalkyl groups, alkylaryl groups, and oligomeric constituents having the structure -Z-X;

wherein each $R_7$ is independently selected from the group consisting of hydrogen, halogen atoms, alkyl groups, alkoxy groups, nitrile groups, nitro groups, amide groups, and sulfonamide groups, and q is an integer between 0 and 4;

wherein $R_8$ and $R_9$ are independently selected from the group consisting of hydrogen, halogen atoms, tertiary amino groups, mine groups, cyano groups, pyridinium groups, ester groups, amide groups, sulfate groups, sulfonate groups, sulfide groups, sulfoxide groups, phosphine groups, phosphinium groups, phosphate groups, nitrile groups, mercapto groups, nitro groups, sulfone groups, acyl groups, azo groups, alkyl groups, alkoxy groups, aryl groups, aryloxy groups, arylalkyl groups, arylalkoxy groups, alkylaryl groups, and alkylaryloxy groups;

wherein each Z is an oligomeric constituent independently selected from the group consisting of:
  (i) oligomers comprising at least three monomers selected from the group consisting of $C_2$-$C_{20}$ alkyleneoxy groups, glycidol groups, and glycidyl groups,
  (ii) aliphatic oligomeric esters conforming to structure (II)

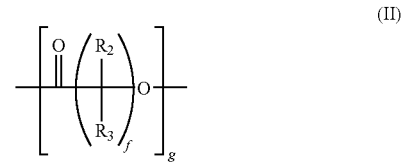

wherein $R_2$ and $R_3$ are independently selected from the group consisting of hydrogen and $C_1$-$C_{10}$ alkyl groups, f is an integer between 1 and 10, and g is any positive integer or fraction between 1 and 20, and
  (iii) combinations of (i) and (ii); and wherein each X is an end group independently selected from the group consisting of hydrogen, hydroxyl groups, thiol groups, amine groups, alkyl groups, aryl groups, alkyl ester groups, aryl ester groups, organic sulfonate groups, organic sulfate groups, and amide groups.

5. The article of claim 1, wherein the polymeric colorant conforms to structure (V)

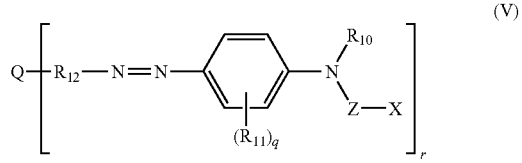

wherein $R_{10}$ is selected from the group consisting of hydrogen, alkyl groups, aryl groups, arylalkyl groups, alkylaryl groups, and oligomeric constituents having the structure -Z-X;

wherein each $R_{11}$ is independently selected from the group consisting of hydrogen, halogen atoms, alkyl groups, alkoxy groups, nitrile groups, nitro groups, amide groups, and sulfonamide groups, and q is an integer between 0 and 4;

wherein $R_{12}$ is selected from the group consisting of aromatic groups and heteroatom-containing aromatic groups;

wherein Q is hydrogen or a linking group selected from the group consisting of oxygen, sulfur, a carbonyl group, a sulfonyl group, a $C_1$-$C_8$ alkyl group, a $C_2$-$C_8$ alkene group, a p-phenylenediamine group, a m-hydroxybenzene group, and a m-di($C_1$-$C_4$)alkoxybenzene;

wherein r is equal to 1 or 2, wherein each Z is an oligomeric constituent independently selected from the group consisting of:
(i) oligomers comprising at least three monomers selected from the group consisting of $C_2$-$C_{20}$ alkyleneoxy groups, glycidol groups, and glycidyl groups.
(ii) aliphatic oligomeric esters conforming to structure (II)

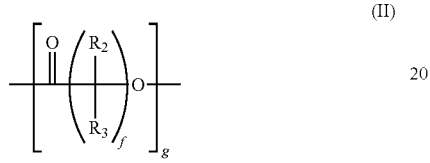

wherein $R_2$, and $R_3$ are independently selected from the group consisting of hydrogen and $C_1$-$C_{10}$ alkyl groups, f is an integer between 1 and 10, and g is any positive integer or fraction between 1 and 20, and
(iii) combinations of (i) and (ii); and wherein each X is an end group independently selected from the group consisting of hydrogen, hydroxyl groups, thiol groups, amine groups, alkyl groups, aryl groups, alkyl ester groups, aryl ester groups, organic sulfonate groups organic sulfate groups, and amide groups.

6. The article of claim 1, wherein the polymeric colorant conforms to structure (VI)

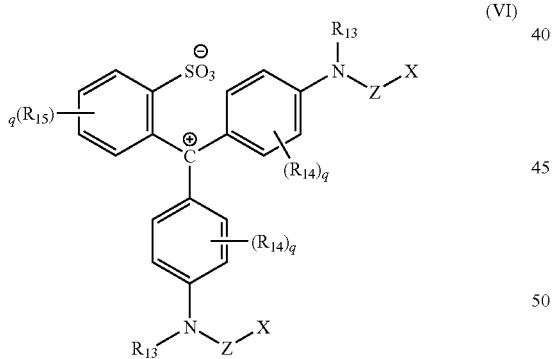

wherein $R_{13}$ is selected from the group consisting of hydrogen, alkyl groups, aryl groups, arylalkyl groups, alkylaryl groups, and oligomeric constituents having the structure -Z-X;

wherein $R_{14}$ is selected from the group consisting of hydrogen, halogen atoms, alkyl groups, alkoxy groups, alkylamino groups, and arylamino groups;

wherein $R_{15}$ is selected from the group consisting of hydrogen, halogen atoms, alkyl groups, alkoxy groups, alkylamino groups, arylamino groups, cyano groups, nitro groups, amide groups, sulfite groups, and sulfonamide groups;

wherein each q is an integer between 0 and 4;

wherein each Z is an oligomeric constituent independently selected from the group consisting of:
(i) oligomers comprising at least three monomers selected from the group consisting of $C_2$-$C_{20}$ alkyleneoxy groups, glycidol groups, and glycidyl groups,
(ii) aliphatic oligomeric esters conforming to structure (ll)

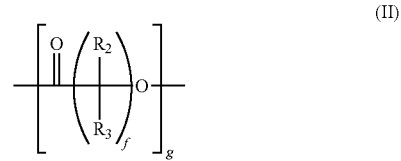

wherein $R_2$ and $R_3$ are independently selected from the group consisting of hydrogen and $C_1$-$C_{10}$ alkyl groups, f is an integer between 1 and 10, and g is any positive integer or fraction between 1 and 20, and
(iii) combinations of (i) and (ii); and wherein each X is an end group independently selected from the group consisting of hydrogen, hydroxyl groups, thiol groups, amine groups, alkyl groups, aryl groups, alkyl ester groups, aryl ester groups, organic sulfonate groups, organic sulfate groups, and amide groups.

7. The article of claim 1, wherein the polymeric colorant conforms to structure (VII)

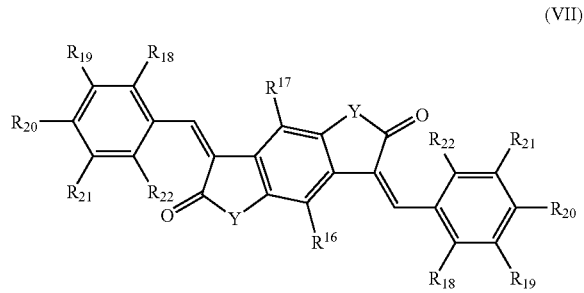

wherein Y is selected from the group consisting of oxygen, sulfur, and —$NR_{40}$, wherein $R_{40}$ is selected from the group consisting of hydrogen, alkyl groups, and aryl groups;

wherein $R_{16}$ and $R_{17}$ are independently selected from the group consisting of hydrogen, halogen atoms, hydroxyl groups, alkyl groups, alkenyl groups, and alkoxy groups;

wherein $R_{18}$, $R_{19}$, $R_{20}$, $R_{21}$, and $R_{22}$ are independently selected from the group consisting of hydrogen, halogen atoms, $C_1$-$C_{20}$ alkyl groups, $C_1$-$C_{20}$ alkylester groups, hydroxyl groups, thio groups, cyano groups, sulfonyl groups, sulfo groups, suifato groups, aryl groups, nitro groups, carboxyl groups, $C_1$-$C_{20}$ alkoxy groups, $C_1$-$C_{20}$ alkylamino groups, acrylamino groups, $C_1$-$C_{20}$ alkylthio groups, $C_1$-$C_{20}$ alkylsulfonyl groups, $C_1$-$C_{20}$ alkyiphenyl groups, phosphonyl groups, $C_1$-$C_{20}$ alkylphosphonyl groups, $C_1$-$C_{20}$ alkoxycarbonyl groups, phenylthio groups, and oligomeric constituents having the structure -E-(Z-X)$_n$;

wherein at least one of $R_{18}$, $R_{19}$, $R_{20}$, $R_{21}$, and $R_{22}$ is an oligomeric constituent having the structure -E-(Z-X)$_n$;

wherein each Z is an oligomeric constituent independently selected from the group consisting of:

(i) oligomers comprising at least three monomers selected from the group consisting of $C_2$-$C_{20}$ alkyleneoxy groups, glycidol groups, and glycidyl groups, (ii) aliphatic oligomeric esters conforming to structure (II)

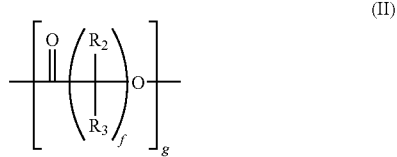

(II)

wherein $R_2$ and $R_3$ are independently selected from the group consisting of hydrogen and $C_1$-$C_{10}$ alkyl groups, f is an integer between 1 and 10 and g is an positive integer or fraction between 1 and 20, and (iii) combinations of (i) and (ii); and wherein each X is an end group independently selected from the group consisting of hydrogen, hydroxyl groups, thiol groups, amine groups, alkyl groups, aryl groups, alkyl ester groups, aryl ester groups, organic sulfonate groups, organic sulfate groups, and amide groups.

8. The article of claim 1, wherein the polymeric colorant conforms to structure (VIII)

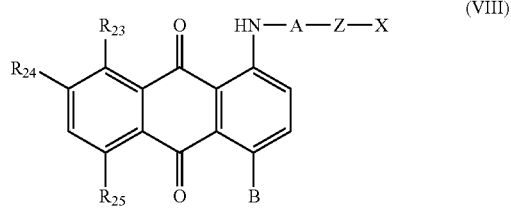

(VIII)

wherein $R_{23}$ is selected from the group consisting of hydrogen, halogen atoms, hydroxyl groups, amine groups, nitro groups, and acetamide groups;

wherein $R_{24}$ and $R_{25}$ are independently selected from the group consisting of hydrogen and hydroxyl groups;

wherein A is selected from the group consisting of alkyl groups and aryl groups; and wherein B is selected from the group consisting of groups conforming to structure (XV) and structure (XVI)

(XV)

(XVI)

wherein $R_{38}$ is selected from the group consisting of hydrogen, $C_1$-$C_{18}$ alkyl groups, and aryl groups; and wherein $R_{39}$ is selected from the group consisting of aryl groups and oligomeric constituents having the structure -A-Z-X;

wherein each Z is an oligomeric constituent independently selected from the group consisting of:

(i) oligomers comprising at least three monomers selected from the group consisting of $C_2$-$C_{20}$ alkyleneoxy groups, glicydol groups, and glycidyl groups, (ii) aliphatic oligomeric esters conforming to structure (II)

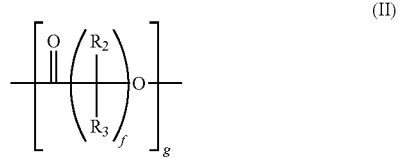

(II)

wherein $R_2$ and $R_3$ are independently selected from the group consisting of hydrogen and $C_1$-$C_{10}$ alkyl groups, f is an integer between 1 and 10, and g is any positive integer or fraction between 1 and 20, and (iii) combinations of (i) and (ii); and wherein each X is an end group independently selected from the group consisting of hydrogen, hydroxyl groups, thiol groups, amine groups, alkyl groups, aryl groups, alkyl ester groups, aryl ester groups, organic sulfonate groups, organic sulfate groups, and amide groups.

* * * * *

UNITED STATES PATENT AND TRADEMARK OFFICE
CERTIFICATE OF CORRECTION

PATENT NO. : 7,662,461 B2
APPLICATION NO. : 11/395665
DATED : February 16, 2010
INVENTOR(S) : Jusong Xia, Zhaolin Zhou and Chenghua Chen It is certified that error appears in the above-identified patent and that said Letters Patent is hereby corrected as shown below:

In Column 22, line 1, delete "R8" and insert --R6--.

In Column 22, line 12, delete the word "mine" and insert the word --imine--.

In Column 25, line 17, delete the last "an" in the line and insert --any--.

Signed and Sealed this

Twentieth Day of April, 2010

David J. Kappos
*Director of the United States Patent and Trademark Office*